(12) United States Patent
Gossett

(10) Patent No.: US 6,982,945 B1
(45) Date of Patent: Jan. 3, 2006

(54) BASEBAND DIRECT SEQUENCE SPREAD SPECTRUM TRANSCEIVER

(75) Inventor: Carroll Philip Gossett, Mountain View, CA (US)

(73) Assignee: Google, Inc., Mountain View, CA (US)

(*) Notice: Subject to any disclaimer, the term of this patent is extended or adjusted under 35 U.S.C. 154(b) by 263 days.

(21) Appl. No.: 09/772,110

(22) Filed: Jan. 26, 2001

(51) Int. Cl.
H04J 11/00 (2006.01)
H04B 7/216 (2006.01)
H04B 1/69 (2006.01)
H03C 1/52 (2006.01)

(52) U.S. Cl. .................. 370/208; 370/342; 455/107; 375/146

(58) Field of Classification Search ............. 370/203, 370/204, 208, 209, 335, 342, 441, 276, 290, 370/296, 320, 294; 375/130, 135, 136, 140, 375/142, 144, 150, 219, 315, 141, 146; 343/702
See application file for complete search history.

(56) References Cited

U.S. PATENT DOCUMENTS

| | | | |
|---|---|---|---|
| 4,358,844 A | | 11/1982 | Pirani ..................... 370/18 |
| 5,623,485 A | * | 4/1997 | Bi .......................... 370/209 |
| 5,646,964 A | * | 7/1997 | Ushirokawa et al. ...... 375/346 |
| 5,649,299 A | | 7/1997 | Battin et al. ............. 455/62 |
| 5,677,929 A | | 10/1997 | Asano et al. ............. 375/206 |
| 5,691,974 A | | 11/1997 | Zehavi et al. ............ 370/203 |
| 5,715,236 A | * | 2/1998 | Gilhousen et al. ........ 370/209 |
| 5,742,694 A | | 4/1998 | Eatwell et al. ........... 381/94.2 |
| 5,809,061 A | * | 9/1998 | Shea et al. ............... 375/206 |
| 5,822,360 A | | 10/1998 | Lee et al. ................. 375/200 |
| 5,825,807 A | * | 10/1998 | Kumar .................... 375/200 |
| 5,864,548 A | * | 1/1999 | Liu ........................ 370/320 |

(Continued)

FOREIGN PATENT DOCUMENTS

| | | |
|---|---|---|
| EP | 1047215 | 10/2000 |
| GB | 2022954 | 12/1979 |
| GB | 2 276 794 | 10/1994 |
| WO | WO00/01091 | 1/2000 |
| WO | WO00/01092 | 1/2000 |

OTHER PUBLICATIONS

Harry Newton, "Newton's Telecom Dictionary", ISBN # 1–57820–069–5, Malt Kelsey published, p. 17.

Bernardini A, et al. Linear Prediction Methods for Interference Elimination in Spread Spectrum Systems, European Transaction on Telecommunications and Related Technologies, AEI, Milano, IT, vol. 1, No. 1, 1990, pp. 67–78, XP000170707, ISSN: 112–38652.

F. Takavira. "Adaptive Lattice Filters for Narrowband Interference Rejection in DS Spread Spectrum Systems", Proceedings of the 1994 IEEE South African Symposium on Communications and Signal Processing, 1994, COMSIG–94, Oct. 4, 1994, pp. 1–5.

Zeidler, et al. "Frequency Tracking Performance of Adaptive Lattice Filters", Conference Record of the Twenty–Fifth Asilomar Conference on Signals, Systems and Computers, 1991, Nov. 4–6, 1991, vol. 2, pp. 643–649.

*Primary Examiner*—Hanh Nguyen (57) ABSTRACT

A baseband direct sequence spread spectrum CDMA transceiver. The data signal is modulated with a Hadamard function having pseudorandomly scrambled rows. This data signal is then broadcast baseband, absent a carrier, by a relatively short, mismatched antenna. The baseband signal is spread out across the DC to 30 MHz spectrum. A low noise, high gainbandwidth product amplifier boosts the baseband RF signal. A correlator/servo system is used to actively cancel the transmit signal from the received signal. Consequently, the same antenna can be used to receive incoming baseband RF signals as well as transmit baseband RF signals, thereby providing full duplex operation.

13 Claims, 6 Drawing Sheets

U.S. PATENT DOCUMENTS

| | | | | |
|---|---|---|---|---|
| 5,940,429 | A | | 8/1999 | Lam et al. ................... 375/200 |
| 5,940,791 | A | | 8/1999 | Byrnes et al. .............. 704/219 |
| 6,005,891 | A | * | 12/1999 | Chadwick et al. ........... 375/224 |
| 6,009,118 | A | | 12/1999 | Tiemann et al. ............. 375/208 |
| 6,009,129 | A | | 12/1999 | Kenney et al. ............. 375/349 |
| 6,072,822 | A | | 6/2000 | Naruse et al. .............. 375/147 |
| 6,091,760 | A | * | 7/2000 | Giallorenzi et al. ........ 375/140 |
| 6,128,332 | A | * | 10/2000 | Fukawa et al. ............. 375/146 |
| 6,169,912 | B1 | * | 1/2001 | Zuckerman ................. 455/570 |
| 6,185,246 | B1 | * | 2/2001 | Gilhousen et al. ........ 375/200 |
| 6,211,828 | B1 | * | 4/2001 | Krylov et al. .............. 343/702 |
| 6,249,760 | B1 | | 6/2001 | Bossemeyer, Jr. .......... 704/225 |
| 6,256,609 | B1 | | 7/2001 | Byrnes et al. .............. 704/246 |
| 6,411,645 | B1 | | 6/2002 | Lee et al. ................... 375/140 |
| 6,426,977 | B1 | | 7/2002 | Lee et al. ................... 375/259 |
| 6,449,305 | B1 | * | 9/2002 | Menich et al. .............. 375/141 |
| 6,463,089 | B1 | * | 10/2002 | Chauncey et al. .......... 375/131 |
| 6,496,474 | B1 | | 12/2002 | Nagatani et al. ............ 370/208 |
| 6,507,573 | B1 | * | 1/2003 | Brandt et al. ............... 370/335 |
| 6,522,656 | B1 | | 2/2003 | Gridley ...................... 370/428 |
| 6,535,544 | B1 | | 3/2003 | Partyka ..................... 375/132 |
| 6,611,600 | B1 | | 8/2003 | Leber et al. .................. 381/66 |
| 6,640,209 | B1 | | 10/2003 | Das ........................... 704/219 |
| 6,665,825 | B1 | * | 12/2003 | Mobin et al. ............... 714/700 |
| 2002/0106004 | A1 | | 8/2002 | Tan .............................. 375/140 |
| 2002/0172180 | A1 | | 11/2002 | Hall et al. .................. 370/342 |
| 2003/0009325 | A1 | | 1/2003 | Kirchherr et al. ........... 704/211 |
| 2003/0185286 | A1 | | 10/2003 | Yuen ......................... 375/152 |

* cited by examiner

BASEBAND DIRECT SEQUENCE SPREAD SPECTRUM TRANSCEIVER

FIELD OF THE INVENTION

The present invention relates to an apparatus and method for providing a full-duplex baseband direct sequence spread spectrum transceiver.

BACKGROUND OF THE INVENTION

Wireless communications has emerged to become a huge market as millions of people world-wide buy cellular handsets, subscribe to Personal Communications Services (PCS), and make calls on a daily basis. There are many competing technologies in the wireless communications field. Initially, cellular transmissions were made according to traditional analog radio frequency (RF) technology. But as wireless digital technology improved, it became clear that digital applications were far superior to that of analog. The three dominant wireless digital technologies existing today include Global System of Mobile communications (GSM), Time Division Multiple Access (TDMA), and Code Division Multiple Access (CDMA). Of these three digital wireless technologies, CDMA is gaining widespread popularity because of its many advantages.

Generally, CDMA offers greater signal quality, resulting in clearer calls. In addition, CDMA utilizes a spread-spectrum approach, which makes it ideal for deployment in dense urban areas where multi-pathing is an issue. This results in fewer dropped calls. Furthermore, CDMA technology is more power efficient, thereby prolonging the standby and active battery life. But one of the most attractive features of CDMA is that it offers a greater capacity for carrying signals. Basically, the airwaves are divided into a number of different frequency bands per Federal Communications Commission (FCC) regulations. A limited segment of the airwaves has been allocated by the FCC for cellular usage. Due to the huge demand for cellular usage and the limited bandwidth that is available, getting a license from the FCC to transmit on a particular frequency band is extremely expensive. By increasing capacity, CDMA enables PCS providers to carry more users per channel. This increased capacity directly translates into greater revenue for cellular companies.

The advantages of CDMA carry over into high-speed wireless digital access. Increasingly, wireless digital applications are being used to access digital data (e.g., the Internet, intranet, multimedia, business data, etc.) at high speeds. With high speed wireless access, mobile users can obtain instant access to the Internet, business data (e.g., stock market quotes, sales reports, inventory information, price checks, customer data, emails, pages, etc.), and other real time data (e.g., traffic updates, weather information, sports news, etc.). The goal is to provide cellular handsets, personal digital assistants, portable communications devices, etc. the ability to transmit and receive digital data as well as make conventional telephone calls. The trend is towards ever faster mobile data speeds to meet customer demands. With greater data speeds, it is possible to provide even more data to more users. Recent CDMA based standards such as IS-95 and 3G are proposing increased data rates and capabilities.

Figure 1:
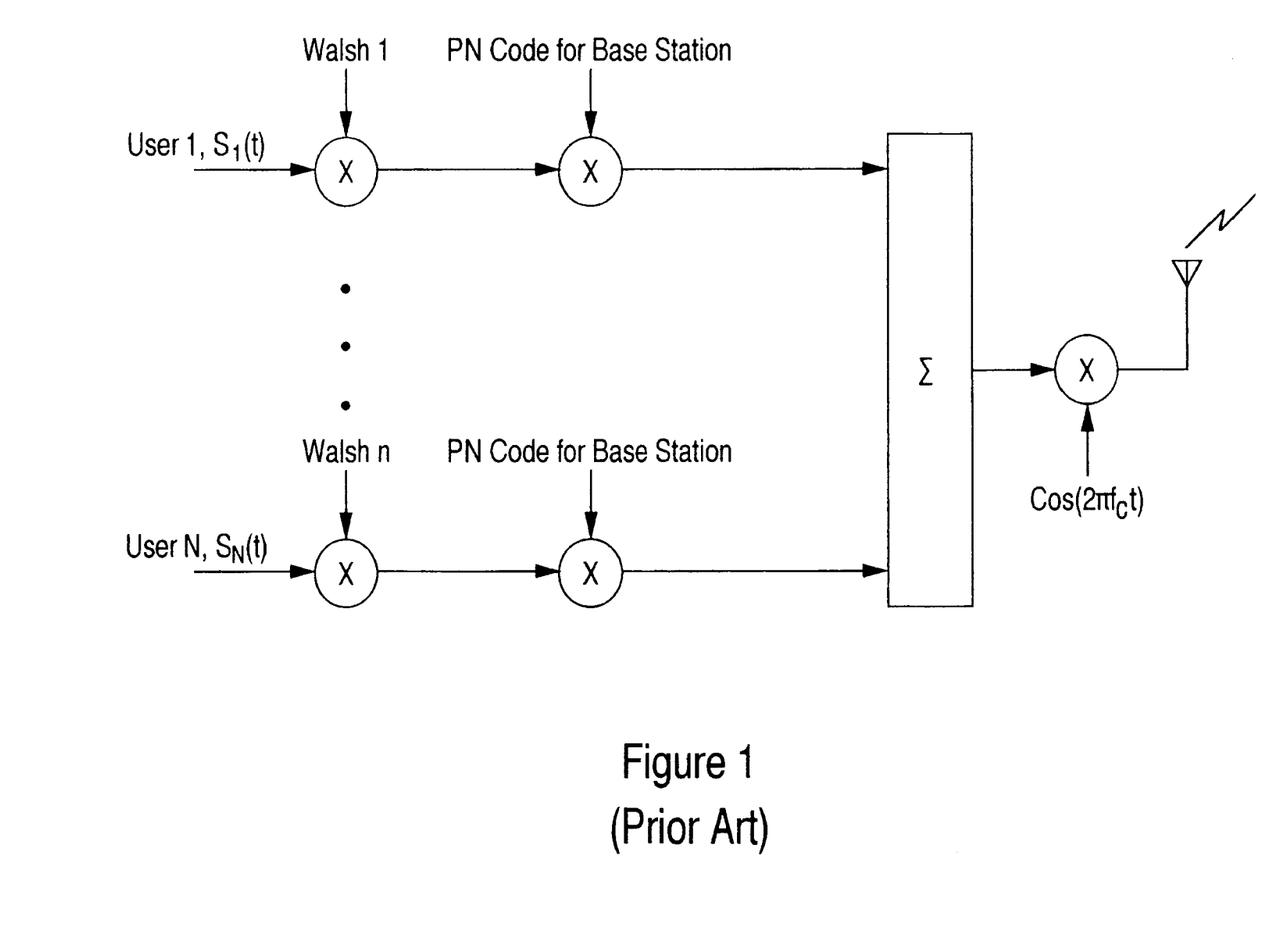
FIG. 1 shows a typical prior art CDMA system.

Presently, virtually all CDMA technology entails using three separate modulation stages. FIG. 1 shows a typical prior art CDMA system. User signals (e.g., digitized voice signals or digital packetized data) are first modulated by a code which enables multiple users to share the same cell. The most commonly used code is known as a "Walsh" function. As stated above, one advantage of CDMA for personal communication services is its ability to accommodate many users on the same frequency at the same time. This is accomplished by assigning a specific "Walsh" code to each user. Only that particular code can demodulate the transmitted signal for that particular user. Since Walsh codes are orthogonal, users with different codes do not interfere with each other. Next, the signal is modulated by a pseudo-random number. This effectively serves to "spread" the transmitted signal across a wider spectrum. By spreading the signal out across a wider spectrum, the overall power of the transmitted signal can be boosted without exceeding the FCC regulations in any one channel. Finally, all users of that cell are summed and modulated by a sinusoidal carrier.

The universally accepted rational behind modulating the signal with a sinusoidal carrier is based on the theory which states that the length of the antenna should be proportional to the wavelength being transmitted. Following this conventional theory, it would be theoretically impossible to design an antenna large enough to efficiently transmit and receive baseband signals. As such, all modern direct sequence, spread spectrum CDMA systems uses a carrier. This extra modulation step adds complexity and incurs extra costs.

Thus, it would be beneficial if there were a way to eliminate one or more of the three separate modulation steps currently used in CDMA systems. Such an apparatus and method would be simpler, more reliable, and more cost efficient to produce.

SUMMARY OF THE INVENTION

The present invention pertains to a baseband direct sequence spread spectrum CDMA transceiver. In one embodiment, the user signal (digitized voice or data) is modulated with a pseudo-random code. Next, the user signal is modulated with an orthogonal function, such as a Walsh function. In the currently preferred embodiment, only one modulation step is required. The user signal is modulated with a Hadamard function having pseudorandomly scrambled rows. This data signal is then broadcast baseband, absent a carrier. This is accomplished by converting the digital user signal into an equivalent 1 volt analog signal which is directly connected to a relatively short, antenna. This antenna is driven mismatched by the analog signal. In the currently preferred embodiment, the transmitted baseband signal is spread out from DC to 30 MHz. On the receive side, a low noise, high gainbandwidth product amplifier boosts the received baseband RF signal. The boosted baseband RF signal is then demodulated. In one embodiment, a correlator/servo system is used to actively cancel the transmit signal from the received signal. Consequently, the same antenna can be used to receive incoming baseband RF signals as well as transmit baseband RF signals, thereby providing full duplex operation. In one embodiment, the baseband direct sequence spread spectrum CDMA transceiver is used for commercial cellular applications and particularly for peer-to-peer communications.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An improved archival process for facilitating database backup is described. Specifically, a streamed database archival process with background synchronization is disclosed. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 2:
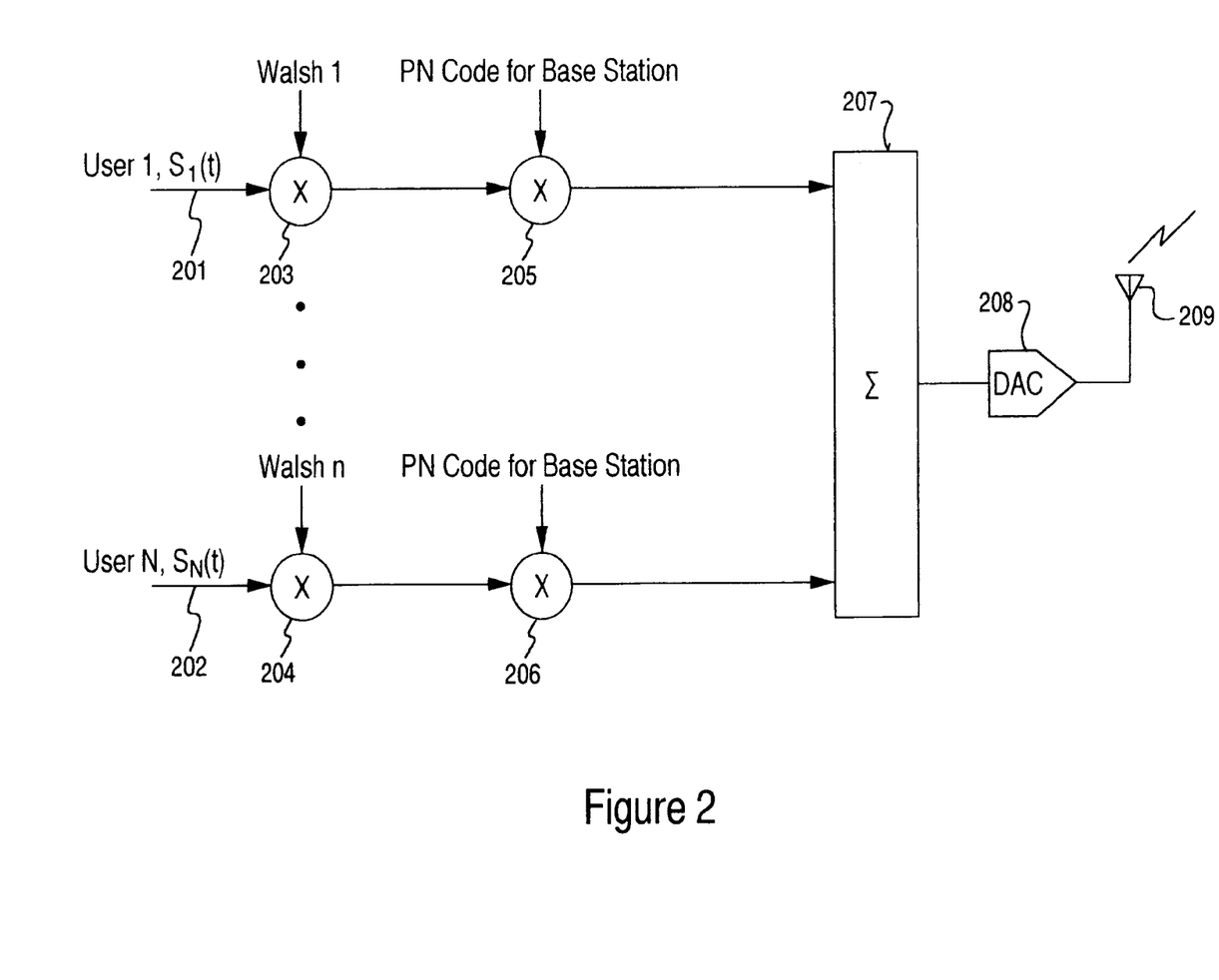
FIG. 2 shows a baseband direct sequence, spread spectrum CDMA transmitter using Walsh functions and a separate pseudo-random code modulator.

Referring to FIG. 2, a baseband direct sequence, spread spectrum CDMA transmitter using Walsh functions and a separate pseudo-random code is shown. User signals (e.g., digitized voice signals or digital packetized data) are first modulated by a Walsh function. This is accomplished by assigning a specific code to each user. Only that particular code can demodulate the transmitted signal for that particular user. More specifically, each user is assigned an orthogonal code. Since the codes are orthogonal, users with different codes do not interfere with each other. One important set of orthogonal codes is the "Walsh" set. From the corresponding matrices shown above, the Walsh codewords are given by the rows. These Walsh codes are important because they form the basis for orthogonal codes with different spreading factors. This property is useful when signals with different spreading factors share the same frequency channel.

For the forward channel, the Walsh functions are used to eliminate multiple access interference among users in the same cell. This can be achieved due to the orthogonality of the waveforms. All users within the same cell are synchronized since the waveforms maintain orthogonality if they are aligned in time. Referring still to FIG. 2, input data (e.g., digitized human speech or packetized data) on lines 201–202 is modulated by one of the orthogonal Walsh functions 203–204. Next, the signals are modulated by pseudo-random number codes 205–206. Finally, all users of that cell are summed 207, and a digital-to-analog converter (DAC) 208 converts the digital signal into a corresponding analog signal for transmission over the air on antenna 209.

Figure 3:
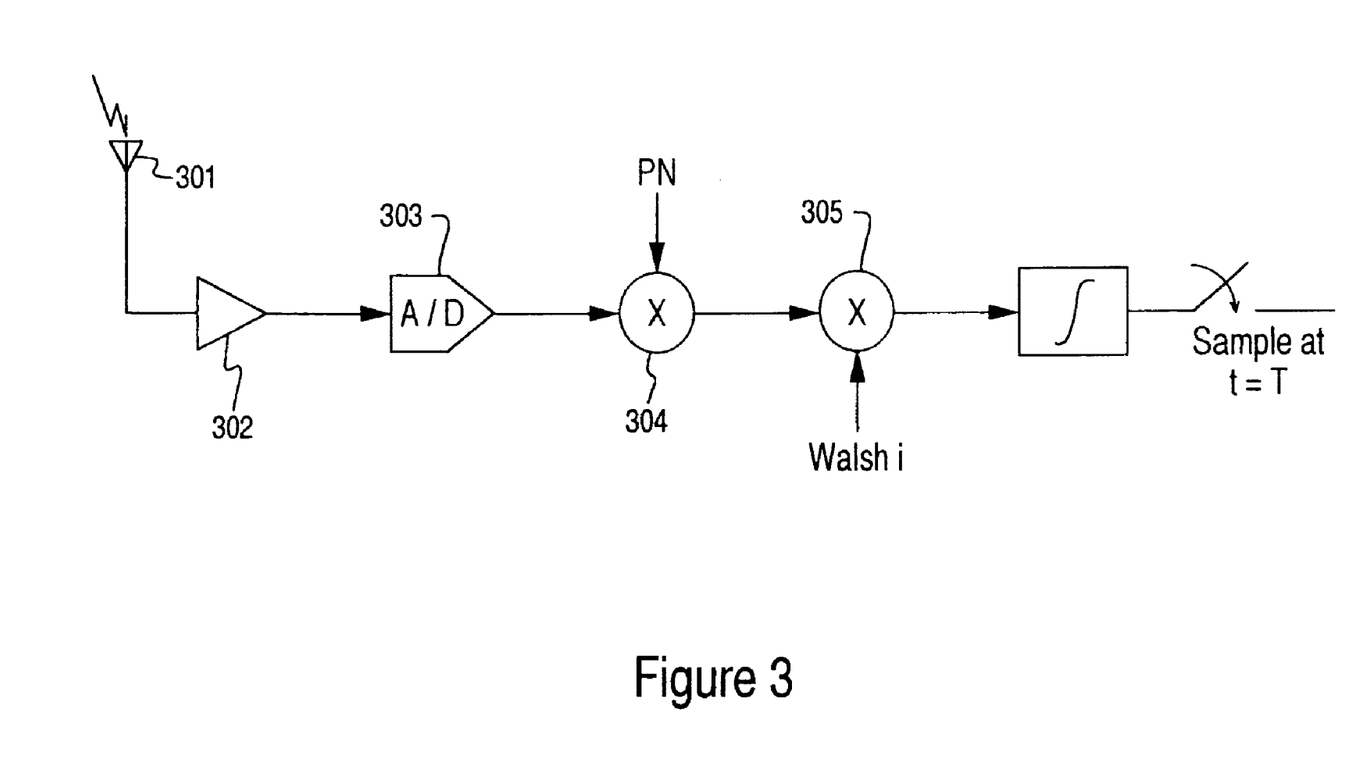
FIG. 3 shows a baseband direct sequence, spread spectrum CDMA receiver using Walsh functions and a separate pseudo-random code modulator.

FIG. 3 shows a baseband direct sequence, spread spectrum CDMA receiver using Walsh functions and a separate pseudo-random code. The RF signal is received over antenna 301. In the currently preferred embodiment, a bandpass filter is used to filter out the AM radio signals (e.g., 0.5 MHz to 1.5 MHz). Furthermore, a high pass filter is used to filter out the higher frequencies (e.g., above 30 MHz). This signal is then amplified by amplifier 302. In the currently preferred embodiment, amplifier 302 is comprised of a two or more baseband video amplifiers coupled in series. This can provide a gainbandwidth product in the Terahertz range. Next, the analog signal is converted into an equivalent digital signal by an analog-to-digital converter 303. Thereupon, the signal is demodulated by multiplying it with the synchronized pseudo-random number 304. This is the same pseudo-random number associated with the base station. Finally, the signal is multiplied by the synchronized Walsh function 305 in order to eliminate interference due to other users' transmission within that cell.

It should be noted that a reasonably short antenna can be used to transmit the baseband direct sequence spread spectrum CDMA signal of the present invention. Conventional antenna design holds that one would need to have a rather large antenna as the size of the antenna necessarily need be made proportional to the wavelength. The classic RF antenna design stipulates that the lower the frequency, the larger the antenna must necessarily be made. Since the present invention broadcasts baseband, convention design techniques call for an infinitely large antenna. As such, CDMA designers have forgone transmitting baseband. Instead, conventional design calls for the use of a carrier due to the limitations imposed by antenna designs. However, it has been discovered in the present invention that a relatively small antenna can be utilized to transmit a baseband direct sequence spread spectrum CDMA signal. The only caveat is that it is not efficient. The smaller antenna results in a mismatched impedance which significantly reduces the RF power being transmitted. Consequently, any antenna that is at least ten times shorter than the transmit signal wavelength can be used. For example, a six inch antenna can be used to transmit the baseband direct sequence spread spectrum CDMA signal in the range of DC to 30 MHz. Rather than having the desired impedance of 100 ohms, this relatively small (e.g., six inches) will have an impedance of approximately 10 Kohms. This results in an impedance mismatch of 100:1. By misdriving the smaller antenna, this essentially results in a decrease in efficiency by a factor of one hundred. However, in order to compensate for this reduction in transmitted RF power, the receiver uses an extremely sensitive high gain amplifier to boost the weak baseband signal. For example, an amplifier having a gain bandwidth product in the Terahertz can be used to effectively amplify the received baseband signal so that it becomes usable.

This baseband direct sequence spread spectrum CDMA transceiver is made possible because of the relatively low spectrum of operation. In the currently preferred embodiment, the transmit frequency ranges from DC to 30 MHz. The 30 MHz upper frequency limit is significant because the Federal Communications Commission (FCC) regulations allow for a greater ceiling of transmit power in 100 kHz bands starting below 30 MHz. In convention CDMA systems, a carrier (e.g., at 700 MHz) is spread out only a fraction of an octave (e.g., spread across 4 MHz). In contrast, the present invention spreads the baseband signal across the entire DC to 30 MHz spectrum. By spreading the baseband signal across per each of the 300 bands, one can transmit a strong signal while yet fully complying with the FCC regulations. Maximally spreading the signal across all bands from DC to 30 MHz means that one can broadcast with a higher overall output power. This results in greater reliability, further range, improved signal-to-noise ratio, and better signal quality. In addition, the relatively low frequencies being used in the present invention has the added benefit of not being as susceptible to multipath and fade problems. Furthermore, the main source of interference would be galactic and ionospheric in nature. As such, it is very far away from the thermal noise floor, and this leaves plenty of room to boost the gain of the receiver.

In the currently preferred embodiment of the present invention, only one modulation step need be performed. The Walsh function and pseudo-number generation can be combined into a single operation. This is accomplished by pseudo-randomly shuffling a Walsh function. One method of performing this is described in the patent application entitled, "Application Of A Pseudo-Randomly Shuffled Hadamard Function In A Wireless CDMA System," filed Dec. 5, 2000, Ser. No. 09/730,697, which is incorporated by reference in its entirety herein.

Figure 4:
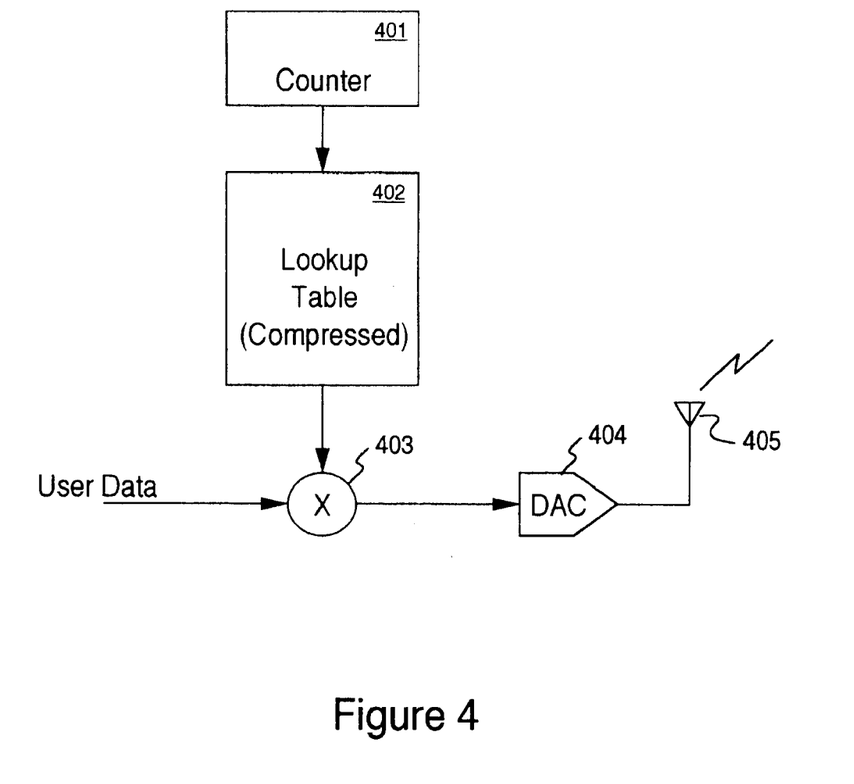
FIG. 4 shows the currently preferred embodiment of a baseband direct sequence spread spectrum CDMA transmitter having a single modulation stage.

FIG. 4 shows the currently preferred embodiment of a baseband direct sequence spread spectrum CDMA transmitter having a single modulation stage. A counter 401 is used as a pointer into a lookup table 402, which enables multiple users to transmit on the same cell. A memory chip contains lookup table 402. The lookup table comprises a pre-generated set of codes. These codes correspond to a Walsh/Hadamard function with pseudorandomly scrambled rows. In the currently preferred embodiment, rather than storing a $2^N$ by $2^N$ scrambled Hadamard function, a more efficient code is stored by using lossless compression. It has been recognized that one property of a Hadamard matrix is that each column is the XOR of the power-of-two numbered columns with a corresponding set bit in the selected channel code number. Thereby, one can compress the Hadamard matrix by storing only the power-of-two numbered columns. In other words, the pseudo-randomly shuffled Hadamard matrix can be compressed and stored as an N by $2^N$ matrix. To recover all desired columns of the original matrix, one can XOR together the columns corresponding to the bits set to "1" in the desired column number. Then, constructively take the output of the table, bit-wise AND the table output with the channel select code (both N bits) and XOR the resulting N bits together. User data, such as digitized speech or packetized data, is input to multiplier 403. The user data is modulated by multiplying the user data with one of the codes contained within the lookup table 402 by multiplier 403. The resulting digital signal is then converted into an equivalent analog signal by DAC 404 and transmitted over the airwaves at approximately 1 volt on antenna 405. Antenna 405 is a six inch long 10Kohm half-wave dipole or monopole antenna.

Figure 5:
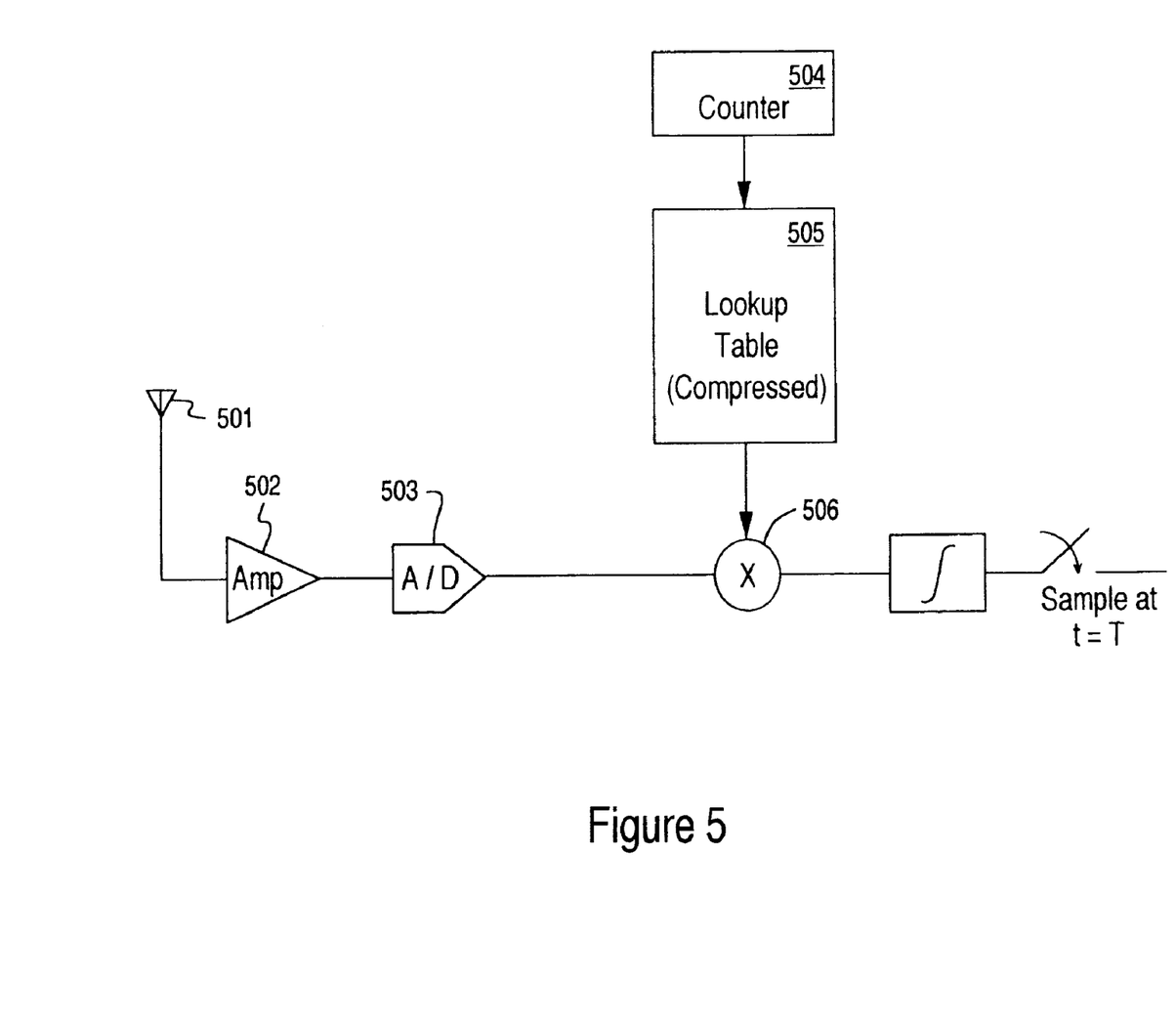
FIG. 5 shows the currently preferred embodiment of a baseband direct sequence spread spectrum CDMA receiver having a single modulation stage.

FIG. 5 shows the currently preferred embodiment of a baseband direct sequence spread spectrum CDMA receiver having a single modulation stage. The RF baseband signal is received on antenna 501. This signal is then amplified by amplifier 502. Amplifier 502 is a low-noise, high gain amplifier with a high gainbandwidth product. Next, the analog signal is converted into an equivalent digital signal by an analog-to-digital converter 503. A multiplier 506 is used to demodulate the received signal according to matching code stored in lookup table 505. A memory chip (DRAM, SRAM, FLASH, ROM, etc.) contains the same lookup table as that of the transmitting CDMA system. In other words, the lookup table has the identical Walsh/Hadamard codes with its rows scrambled same as that of the corresponding transmitter. The contents of lookup table 505 of the receiver is the same as the contents of the lookup table 402 of the transmitter (shown in FIG. 4). A counter 504 is used as a pointer to the code which is to be used in lookup table 505. The two counters (i.e., counter 401 in the transmitter and counter 504 of the receiver) are synchronized in time. This synchronization maintains orthogonality and enables the receiver to correlate the Walsh/Hadamard codes. The synchronization is achieved by transmitting a pilot signal to enable the receiver to recover synchronization, or by other methods (e.g., servoing to correlation peaks in the coded data stream).

Figure 6:
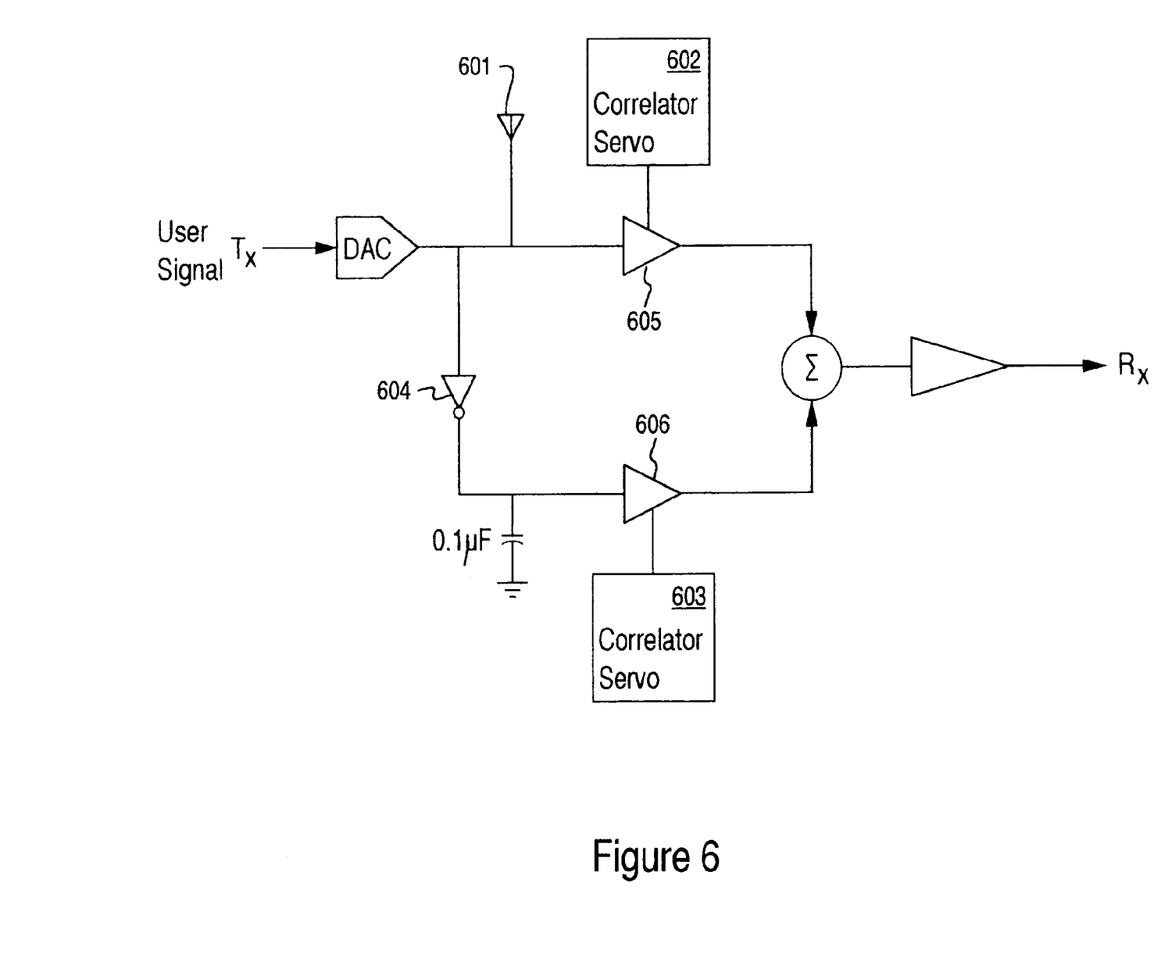
FIG. 6 is a circuit diagram of a currently preferred embodiment of a baseband direct sequence spread spectrum CDMA transceiver having a single modulation stage.

FIG. 6 is a circuit diagram of a currently preferred embodiment of a baseband direct sequence spread spectrum CDMA transceiver having a single modulation stage. In the currently preferred embodiment, the same antenna 601 is used to both transmit the baseband signal as well as receive incoming baseband signals. Due to the fact that the RF power being transmitted by the transmitter and the degree of amplification associated with the receiver are both relatively high, it is important to cancel out the transmit from the receive signal. This is accomplished by using two separate servo loops 602 and 603. It is the function of the servo system to cancel out the transmit signal from the receive signal.

Basically, the digital transmit user signal is converted into an equivalent analog signal and transmitted baseband direct sequence spread spectrum CDMA over antenna 601 as discussed above. Furthermore, a separate path for the transmit signal is provided to inverter 604. This provides an inverted transmit signal to amplifier/attenuator 606. On the receive side, the same antenna 601 is used to receive RF signals. The received signal is input to amplifier/attenuator 605. A correlator compares the transmit signal against the receive signal. A positive correlation causes the servo to attenuate or subtract more of the transmit signal. Conversely, a negative correlation causes the servo system to appropriately amplify or boost the transmit signal. The transmit signal is either attenuated or amplified by the servo controlling amplifier/attenuator elements 605 and 606 (with appropriate delays to match the paths). In the past, isolation between the transmit and receive signals were achieved by using different frequencies or by using some type of time division multiplexing (e.g., half duplex). In contrast, the currently preferred embodiment utilizes an active servo system based on the correlation between the transmit and receive signals to provide full duplex capabilities over the same shared antenna or two or more antennas close to each other.

It should be noted that the present invention can be applied to any modulation scheme, either wireless or hardwired, which utilizes a spread-spectrum technique. In particular, the present invention can be applied to CDMA cellular handsets as well as other wireless mobile CDMA devices or appliances. Current cell phones can be modified to use the present invention with reduced cost. Furthermore, the present invention is applicable to full duplex as well as half duplex applications. Moreover, the present invention can be expeditiously applied to peer-to-peer wireless applications, especially for peer-to-peer cellular communications. One such system upon which the present invention may be practiced is described in the patent application entitled, "A Communications Network Quality Of Service System And Method For Real Time Information," filed Dec. 12, 2000, Ser. No. 09/738,010, which is incorporated by reference in its entirety herein.

Therefore, a full-duplex baseband direct sequence spread spectrum CDMA transceiver is disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for transmiting an RF signal comprising:
    modulating a data signal with an orthogonal pseudo random code;
    transmitting the data signal as a baseband direct sequence spread spectrum CDMA (Code Division Multiplex Access), wherein no additional modulation is performed on the data signal before transmission and the baseband direct sequence spread spectrum data signal is spread across DC to 30 MHz;
    driving a mismatched antenna; and
    actively servoing a transmit signal to cancel the transmit signal from a receive signal.

2. The method of claim 1 further comprising the step of using a same antenna to transmit and receive baseband signals in a full duplex mode of operation.

3. A method for transmitting an RF signal, comprising:
    modulating a data signal in a single step with a Hadamard function having pseudorandomly scrambled rows;
    driving a mismatched antenna; and
    transmitting the data signal as baseband direct sequence spread spectrum CDMA (Code Division Multiplex Access) across DC to 30 MHz.

4. The method of claim 3 further comprising the step of converting a digital data signal into an equivalent analog signal which is directly transmitted by an antenna over the air, wherein the antenna is at least ten times shorter than the wavelength of the signal being transmitted.

5. The method of claim 3 further comprising the step of actively servoing a transmit signal to cancel the transmit signal from a receive signal.

6. The method of claim 3 further comprising the step of using a same antenna to transmit and receive baseband signals in a code division duplex mode of operation.

7. The method of claim 3 further comprising the step of transmitting baseband signals for peer-to-peer cellular communications.

8. A baseband direct sequence spread spectrum CDMA transceiver comprising:
    a transmitter which modulates data by a Hadamard function having pseudorandomly shuffled rows or columns, wherein the data is only modulated in one single modulation step with no additional modulation before transmission; and
    an antenna shorter than transmit signal wavelength for broadcasting baseband signals across DC to 30 MHz spectrum, wherein the antenna is driven mismatched.

9. The baseband direct sequence spread spectrum CDMA transceiver of claim 8 wherein the antenna is at least ten times shorter than the transmit signal wavelength.

10. The baseband direct sequence spread spectrum CDMA transceiver of claim 8 comprising a code division duplex mode of operation.

11. The baseband direct sequence spread spectrum CDMA transceiver of claim 8 further comprising a low noise high gain bandwidth amplifier for boosting a received baseband signal.

12. The baseband direct sequence spread spectrum CDMA transceiver of claim 8 further comprising a lookup table utilized to modulate and demodulate the baseband signal and a pointer for pointing to Walsh/Hadamard codes corresponding to said Hadamard function.

13. The baseband direct sequence spread spectrum CDMA transceiver of claim 8 further comprising an active servo system for canceling transmit signals from receive signals.

* * * * *